(12) United States Patent
Kim et al.

(10) Patent No.: US 12,553,639 B2
(45) Date of Patent: Feb. 17, 2026

(54) HVAC CONTROLLER

(71) Applicant: RESIDEO LLC, Golden Valley, MN (US)

(72) Inventors: Hyunki Kim, Golden Valley, MN (US); Robert D. Juntunen, Golden Valley, MN (US)

(73) Assignee: RESIDEO LLC, Golden Valley, MN (US)

( * ) Notice: Subject to any disclaimer, the term of this patent is extended or adjusted under 35 U.S.C. 154(b) by 117 days.

(21) Appl. No.: 18/285,358

(22) PCT Filed: Apr. 2, 2021

(86) PCT No.: PCT/US2021/025585
§ 371 (c)(1),
(2) Date: Oct. 2, 2023

(87) PCT Pub. No.: WO2022/211818
PCT Pub. Date: Oct. 6, 2022

(65) Prior Publication Data
US 2024/0183567 A1    Jun. 6, 2024

(51) Int. Cl.
*F24F 11/88*    (2018.01)
*F24F 140/50*    (2018.01)

(52) U.S. Cl.
CPC ........... *F24F 11/88* (2018.01); *F24F 2140/50* (2018.01)

(58) Field of Classification Search
CPC .. F24F 11/30; F24F 11/46; F24F 11/88; F24F 2140/50; G05D 23/19; H02J 7/345
See application file for complete search history.

(56) References Cited

U.S. PATENT DOCUMENTS 7,642,674 B2    1/2010  Mulhouse et al.
10,601,421 B1   3/2020  Ponce et al.
(Continued)

FOREIGN PATENT DOCUMENTS

CN    111900797 A    11/2020

OTHER PUBLICATIONS

International Search Report and Written Opinion mailed Mar. 1, 2022 in corresponding PCT Patent Application No. PCT/US2021/025585 (16 pages).

*Primary Examiner* — Marc E Norman
(74) *Attorney, Agent, or Firm* — Greenberg Traurig, LLP; Ryan Sharp; David J. Dykeman

(57) ABSTRACT

A controller for an environmental control system, e.g., an HVAC system, that includes a power circuit for providing power to some components of the controller across a variety of HVAC systems. The HVAC controller of this disclosure may include components with power stealing circuitry to run components. However, because the diversity of HVAC system loads and configurations, some power stealing circuitry may not function as desired to draw the power for operation in some systems. The universal AC power circuit included in the HVAC controller of this disclosure may provide power to components of the HVAC controller when the power stealing circuitry may be incompatible with certain HVAC systems. In this manner, the universal AC power circuit may allow the HVAC controller of this disclosure to be compatible with and operate to control a wide variety of environmental control systems.

20 Claims, 7 Drawing Sheets

(56) References Cited

U.S. PATENT DOCUMENTS

| | | | |
|---|---|---|---|
| 11,098,913 B2* | 8/2021 | Lemire | F24F 11/52 |
| 2014/0299670 A1* | 10/2014 | Ramachandran | G05D 23/19 |
| | | | 236/1 C |
| 2015/0001930 A1 | 1/2015 | Juntunen et al. | |
| 2016/0164310 A1 | 6/2016 | Juntunen et al. | |
| 2018/0003744 A1 | 1/2018 | Juntunen et al. | |
| 2019/0056131 A1 | 2/2019 | Warren et al. | |
| 2020/0386434 A1 | 12/2020 | Blair | |
| 2021/0255648 A1* | 8/2021 | Kim | H03K 17/6877 |
| 2022/0136729 A1* | 5/2022 | Murillo Carrasco | |
| | | | G05D 23/1902 |
| | | | 700/278 |

* cited by examiner

HVAC CONTROLLER

CROSS-REFERENCE TO RELATED APPLICATIONS

This application is a U.S. National Phase patent application under 35 U.S.C. 371 of International Application No. PCT/US2021/025585, filed Apr. 2, 2021, which is incorporated herein by reference in its entirety.

TECHNICAL FIELD

The disclosure relates to power supply circuits for HVAC thermostats.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, an HVAC controller may control different devices of an environmental control system depending on the outside temperature, temperature inside the building, the time of day, and other factors. Environmental control systems may also include evaporative cooling systems, also referred to as "swamp coolers" in this disclosure, as well as other systems such as window mounted heat exchangers and two-part heat exchangers, which may be used for heating or cooling building spaces. Two-part heat exchangers may include an inside heat exchanger and an outside heat exchanger connected by piping. To simplify the explanation, an environmental control system will be referred to as an HVAC system, unless otherwise noted.

SUMMARY

In general, the disclosure describes a controller for an environmental control system, e.g., an HVAC system, that includes a circuit for providing power to some components of the controller across a variety of HVAC systems. The HVAC controller of this disclosure may include components with power stealing circuitry to run components. However, because the diversity of HVAC system loads and configurations, some power stealing circuitry may not function as desired to draw the power for operation in some systems. The universal AC power circuit included in the HVAC controller of this disclosure may provide power to components of the HVAC controller when the power stealing circuitry may be incompatible with certain HVAC systems. In this manner, the universal AC power circuit may allow the HVAC controller of this disclosure to be compatible with and operate to control a wide variety of systems. An HVAC controller of this disclosure may include a thermostat and may be referred to simply as a thermostat to simplify the explanation of the techniques of this disclosure.

In one example, this disclosure describes a circuit comprising an input interface; a signal conditioner and driver connected to the input interface; an isolation transformer connected to the signal conditioner and driver, an alternating current (AC) load switch circuit includes a reference terminal, a mode terminal, a Vcc terminal, and a power stealing element; and a mode switch comprising a control terminal configured to control a connection between the mode terminal and the reference terminal; wherein: the input interface comprises a transistor having an input for receiving signal, the signal conditioner and driver comprise a dual channel circuit, the dual channel circuit has a first input connected to an output of the transistor, and a second input connected to the input of the transistor, the isolation transformer has a first end of a primary winding connected to a first output of the dual channel circuit and a second end of the primary winding connected to a second output of the dual channel circuit, the transformer has a first end of a secondary winding connected to the reference terminal of the AC load switch circuit and a second end of the secondary winding connected to the control terminal of the mode switch, and closing the mode switch disables the power stealing element of the AC load switch circuit.

In another example, this disclosure describes a method comprising: receiving alternating current (AC) electrical power at a first power input terminal; receiving an electrical connection at a power output terminal; determining whether a load is connected to the power output terminal, wherein determining that a load is connected comprises charging an electrical power storage device using power from the load, and wherein a power stealing circuit obtains the electrical power to charge the electrical power storage device; in response to determining that the load is connected to the power output terminal, determining whether the power stealing circuit charges the electrical power storage device above a voltage threshold; in response to determining that the power stealing circuit does not charge the electrical power storage device above the threshold, receiving direct current (DC) power at a second power input terminal and disabling the power stealing circuit.

In another example, this disclosure describes a heating, ventilation and air conditioning (HVAC) controller that includes an alternating current (AC) load switch circuit comprising a first power input terminal, a second power input terminal, a power output terminal, and a power stealing element, the AC load switch circuit configured to: receive AC power at the first power input terminal; determine whether an HVAC load is connected to the power output terminal; siphon electrical power, with the power stealing element, from the HVAC load when the HVAC load is connected to the power output terminal; a power converter circuit configured to receive a drive signal and in response to receiving the drive signal, output electrical power to the second power input terminal; processing circuitry operatively coupled to a memory; the processing circuitry configured to: receive an indication of whether the HVAC load is connected to the power output terminal; receive an indication of whether a voltage magnitude at the second power input terminal is above a threshold voltage; in response to determining that: the HVAC load is connected to the power output terminal, and the voltage magnitude at the second power input terminal is less than a voltage magnitude; output the drive signal to the power converter circuit.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes a controller for an environmental control system with a universal AC power circuit for providing power to some components of the controller across a variety of environmental control systems, e.g., an HVAC system. The controller of this disclosure may include components with power stealing circuitry to run components. However, because the diversity of HVAC system loads and configurations, some power stealing circuitry may not function as desired to draw the power for operation in some systems. The universal AC power circuit included in the HVAC controller of this disclosure may provide power to components of the HVAC controller when the power stealing circuitry may be incompatible with certain HVAC systems. In other examples, an HVAC controller may be configured to operate at low voltage, for example to conserve or reduce energy consumption. In some examples, operating at a low voltage may make some components of the HVAC system more sensitive to power fluctuations or interference. In other examples, some HVAC load may be low or zero current but high voltage, e.g., a "dry contact." Dry contact may refer to a secondary set of contacts, such as a relay circuit or the contacts in a compressor contactor, which does not make or break the primary current being controlled by the relay. The universal AC power circuit may allow the HVAC controller of this disclosure to be compatible with and operate to control a wide variety of environmental control systems and configurations.

Figure 1:
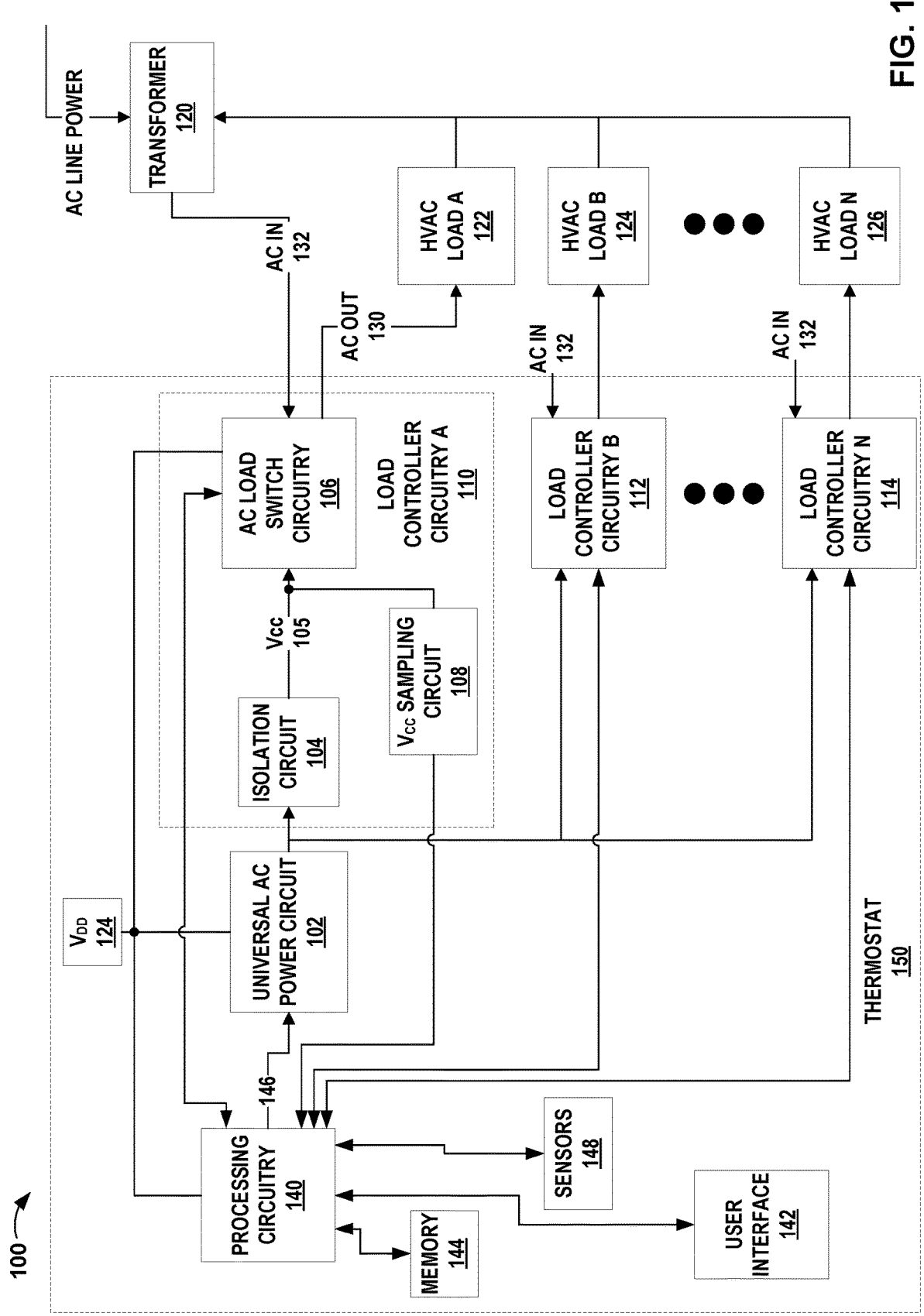
FIG. 1 is a block diagram illustrating an example HVAC system including multiple loads according to one or more techniques of this disclosure.

FIG. 1 is a block diagram illustrating an example HVAC system with multiple loads according to one or more techniques of this disclosure. HVAC controller 100 may turn on an off one or more HVAC loads, such as a furnace, heat pump, air conditioning heat exchanger unit, electric heater, and so on based on comparing a measured temperature to a temperature setpoint.

In the example of FIG. 1, HVAC system 100 may include thermostat 150 with processing circuitry 140 that is operatively coupled to memory 144, one or more sensors 148 and a user interface 142. Processing circuitry 140 of thermostat 150 may communicate with and control the operation of one or more of load controller circuitry A 110, load controller circuitry B 112, and load controller circuitry N 114. Vdd 124 may provide power to digital loads of thermostat 150, such as processing circuitry 140, and digital portions of AC load switch circuitry 106. Each of load controller circuitry A 110-N 114 may respectively switch on and off HVAC load A 122, HVAC load B 124 through HVAC load N 126. Transformer 120 may receive line voltage, e.g., 120 V AC at 60 Hz, 100V AC at 50 Hz, 230 V AC at 50 Hz, 240 V AC at 50 Hz and so on depending on the region of the world in which HVAC system 100 is operating. Transformer 120 may step down the line voltage to an AC voltage used for powering the load control circuitry, e.g., to 24V AC in some examples. In other examples, HVAC system 100 may include more or fewer components than those shown in FIG. 1. In some examples, HVAC system 100 may include two or more transformers 120. Thermostat 150 of HVAC system 100 may also be referred to as an HVAC controller or smart thermostat in this disclosure. In this disclosure the term "circuitry" may indicate an arrangement of circuit elements with one or more additional components, such as a processor, communication circuitry and so on. The term "circuit" may indicate an arrangement of circuit elements. However, the terms circuit and circuitry may be generally used interchangeably in this disclosure.

HVAC loads A 122, B 124 through N 126 may include any environmental control apparatus that may be included in HVAC system 100. For example, HVAC load A 122 may be furnace or a first stage of a multi-stage heating system. HVAC loads B 124 through N 126 may each respectively be a heat pump, geothermal heat pump, air conditioning unit, fan, vent baffles of a multi-zone system, electrical heating, attic vent, whole house fan, boiler, in-floor heating, humidifier, air cleaner or any other type of component of an HVAC system used to control the environment of one or more spaces within a building or similar structure.

Load controller circuitry A 110 includes isolation circuit 104, AC load switch circuitry 106 and in some examples may include Vcc sampling circuit 108. In some examples, AC load switch circuitry 106 may be implemented as an integrated circuit, such as an application specific integrated circuit (ASIC) and may be referred to as ASIC 106 in this disclosure. Though shown as separate components in the example of FIG. 1 to simplify the description, in other examples, any of universal AC power circuit 102, isolation circuit 104 and/or Vcc sampling circuit 108 may be implemented on a single IC, e.g., as part of AC load switch circuitry 106, by discrete or integrated logic circuitry, or using other circuit arrangements. Any of the functions and components of load controller circuitry A 110 may be enabled or disabled, e.g., based on a command or signal from processing circuitry 140. Load controller circuitry B 112 and load controller circuitry N 114 may also include similar components and perform the same or similar operation as described for load controller circuitry A 110.

AC load switch circuitry 106 may receive commands or signals from processing circuitry 140, e.g., an address selection, or control lines held to a logical HIGH or logical LOW. In some examples, AC load switch circuitry 106 may include digital communication circuitry and communicate with processing circuitry 140 to send and receive digital messages. AC load switch circuitry 106 may include switching circuits, such as a solid-state relay (SSR) or similar circuit to control the AC current to HVAC load A 122. For example, AC load switch circuitry may control AC current received from transformer 120 via AC IN line 132, and output to HVAC load A 122 via AC OUT 130. For example, a call for heat from processing circuitry 140, based on a temperature falling below a temperature setpoint may signal load controller circuitry A 110 to energize a power switch, such as a solid state relay (SSR) of AC load switch circuitry 106 to start a furnace, or similar component of HVAC load A 122.

AC load switch circuitry 106 may also include load sensing circuitry and power stealing circuitry. In some examples, load sensing circuitry may detect whether a load is connected to load controller circuitry A 110. In some examples, HVAC system 100 may include any combination of HVAC components. Some examples of HVAC system 100 may include only a gas fired furnace. Other examples of HVAC system 100 may only include an air conditioning unit, e.g., a unit used to cool and remove humidity from one or more spaces within a building and transfer the heat from inside the building to a heat exchanger located outside the building. The load sensing circuitry of AC load switch circuitry 106 may detect whether an HVAC component has been connected to load controller circuitry A 110. In some examples, communication circuitry of AC load switch circuitry 106 may send a digital signal to processing circuitry 140 and provide information about the load connected to load controller circuitry A 110.

In other examples, power stealing circuitry of AC load switch circuitry 106 may automatically begin siphoning power from HVAC load A 122. Vcc sampling circuit 108 may be a high impedance measurement circuit configured to detect the power stealing, e.g., by detecting a voltage above a voltage threshold at Vcc 105. Vcc sampling circuit 108 may send a signal to processing circuitry 140 of the detected voltage at Vcc 105. Based on the signal from Vcc sampling circuit 108, processing circuitry 140 may determine HVAC load A 122 has been connected to AC load switch circuit 106. In this manner, Vcc sampling circuit 108 may send an indication to processing circuitry 140 of the load connected to AC load switch circuit 106. The indication from Vcc sampling circuit 108 to processing circuitry 140 may be desirable in examples in which AC load switch circuitry 106 does not include digital communication circuitry.

In some examples, the indication from Vcc sampling circuit 108, or a digital signal via the communication circuitry, may set a register or similar setting value, for example, within memory 144. Processing circuitry 140 may read the register during power up and initial setup (ISU) to determine which load controllers have connections to an operating HVAC load. For example, the register, or registers set at memory 144 may indicate to processing circuitry 140 whether HVAC load A 122 is connected. Similarly, the value that processing circuitry 140 reads from memory 144 may indicate which, if any, of HVAC loads B 124 through N 126 respectively are connected, to load controller circuitry B 112 through N 114.

During initial setup, processing circuitry 140 may cause user interface 142 to display a series of questions and configuration options that are specific to the types and number of HVAC loads connected to HVAC system 100. In this manner, initial setup for an HVAC system using thermostat 150 may be simplified and less error prone when compared to other types of thermostats. For example, rather than asking the user to walk through all the possible HVAC loads, or asking the user to identify all the HVAC loads, thermostat 150 may ask focused configuration questions based only on the specific number and types of HVAC loads sensed by load controller circuitry A 110 through load controller N 114. Thermostat 150, according to the techniques of this disclosure may provide advantages over other types of thermostats that only detect whether or not a wire is connected, e.g., by means of a mechanical indicator or other type of wire sensor. In some examples, a field wire may connect to a load controller, but there is no actual load connected on the other end. In contrast to a wire sensor, thermostat 150 of this disclosure may detect whether an actual load is active and connected. Also, thermostat 150 may be less likely to skip setting up a type of load that may be connected, when compared to a thermostat that requires the user to input the types of loads in the HVAC system.

In this manner, the combination of load sensing, and the ISU functions on user interface 142 may configure thermostat 150 for the types of loads connected to HVAC system 100. For example, when connected to a low voltage—high current load, such as a thermopile, or to a high voltage-low current load, such as a dry contact, processing circuitry 140 may determine that the load is not sufficient for power stealing and turn off power stealing for the associated load controller circuitry, e.g., load controller circuitry B 112. However, during initial setup, a user may configure the load via user interface 142 to operate the associated load, e.g., for load comprising one of a thermopile or a condenser contactor or other load that cannot provide sufficient power for power stealing.

In addition to the setup functions, processing circuitry 140 may execute an application, e.g., based on instructions stored at memory 114, to monitor temperature, display temperatures, communicate with network, manage programmed schedules and so on. In addition to comparing a temperature to a temperature setpoint to control the HVAC loads, processing circuitry 140 may also receive signals from other types of sensors that are part of sensors 148. In some examples, sensors 148 may include internal and external temperature and humidity sensors, air quality sensors, presence sensors, window and/or door open or closed sensors, light sensors, and so on. Processing circuitry 140 may also include communication circuits that communicate via wired or wireless means to other computing devices, such as a local and/or remote server, mobile devices, and the like. In some examples, processing circuitry 140 may retrieve local weather conditions and weather predictions from Internet sources and, based on the instructions stored at memory 144, control the operation of one or more HVAC loads based on the weather conditions, and the indications from sensors 148.

Examples of processing circuitry 140 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Examples of memory 144 may include any type of computer-readable storage media. include random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or non-volatile memory device. In some examples the computer readable storage media may store instructions that cause the processing circuitry to execute the functions described herein. In some examples, the computer readable storage media may store data, such as configuration information, temporary values and other types of data used to perform the functions of this disclosure.

User interface 142 may include one or more displays, which may include touch sensitive portions of the display configured to receive input from a user. User interface 142 may also include other types of input devices such as knobs, buttons, sliders, levers switches and so on. Other types of output devices may also include lights and audio devices.

Universal AC power circuit 102 may provide power AC load switch circuitry 106 of load controller circuitry A 110, or other functional blocks of load controller circuitry A 110 when power stealing may not be compatible with certain loads. For example, some HVAC loads may include low voltage and low power devices for when the HVAC load is in standby. In some examples, a furnace, boiler, or similar device may include a flame powered device, e.g., a thermopile, to operate some circuits when in standby. A thermopile may not provide enough power to fully operate the functions of AC load switch circuitry 106 through the power stealing functions of AC load switch circuitry 106. Processing circuitry 140 may determine that a load is connected but cannot provide enough electrical energy for the power stealing element to function. Then universal AC power circuit 102 may receive drive signal 146 from processing circuitry 140 which may cause universal AC power circuit 102 to output a voltage to Vcc 105 via isolation circuit 104 to provide power to AC load switch circuitry 106. In some examples, drive signal 146 may be a pulse modulated signal. Universal AC power circuit 102 may also provide power to any one or more of load controller circuitry B 112 through N 114, as needed.

Processing circuitry 140 may output drive signal 146 based on indications from Vcc sampling circuit 108 or digital communication from AC load switch circuitry 106 indicating the type of load connected to load controller circuitry A 110 as well as inputs from a user during startup via user interface 142. Based on the indications, and the inputs, processing circuitry 140 may determine that HVAC load A 122 may be a type that provides enough power to operate AC load switch circuitry 106 from the power stealing functions of AC load switch circuitry 106. For example, the power stealing function may cause Vcc 105 to be greater than a threshold voltage. Vcc sampling circuit 108, a digital message from AC load switch circuitry 106 may indicate to processing circuitry 140 that the power stealing function are providing enough power such that Vcc 105 exceeds a threshold voltage. When the power stealing function provides enough electrical power for load controller circuitry A 110 to operate, then processing circuitry 140 may not output drive signal 146.

In other examples, such as a thermopile type system, the load sensing functions of AC load switch circuitry 106, or Vcc sampling circuit 108, may output an indication to processing circuitry 140 that the power stealing functions may not provide enough power to operate one or more circuits of load controller circuitry A 110. Also, a user input during initial setup may indicate that processing circuitry 140 should activate universal AC power circuit 102 to provide power to load controller circuitry A 110, and/or other of load controllers, e.g., load controller circuitry B 112.

In some examples, universal AC power circuit 102 may be implemented as one or more switching circuits, such as transistors. In some examples, isolation circuit 104 may be implemented as a galvanic isolation circuit, such as a transformer, semiconductors, capacitive isolation, and similar circuits. In other examples, the functions of universal AC power circuit 102 and isolation circuit 104 may be implemented using a switched capacitor power converter, flyback power converter, push-pull power converter, other types of isolated power converters, or non-isolated power converters with additional isolation circuits. Universal AC power circuit 102 may also be described as a power converter that converts a voltage from Vdd 124 and outputs a voltage to Vcc 105 via isolation circuit 104.

Figure 2:
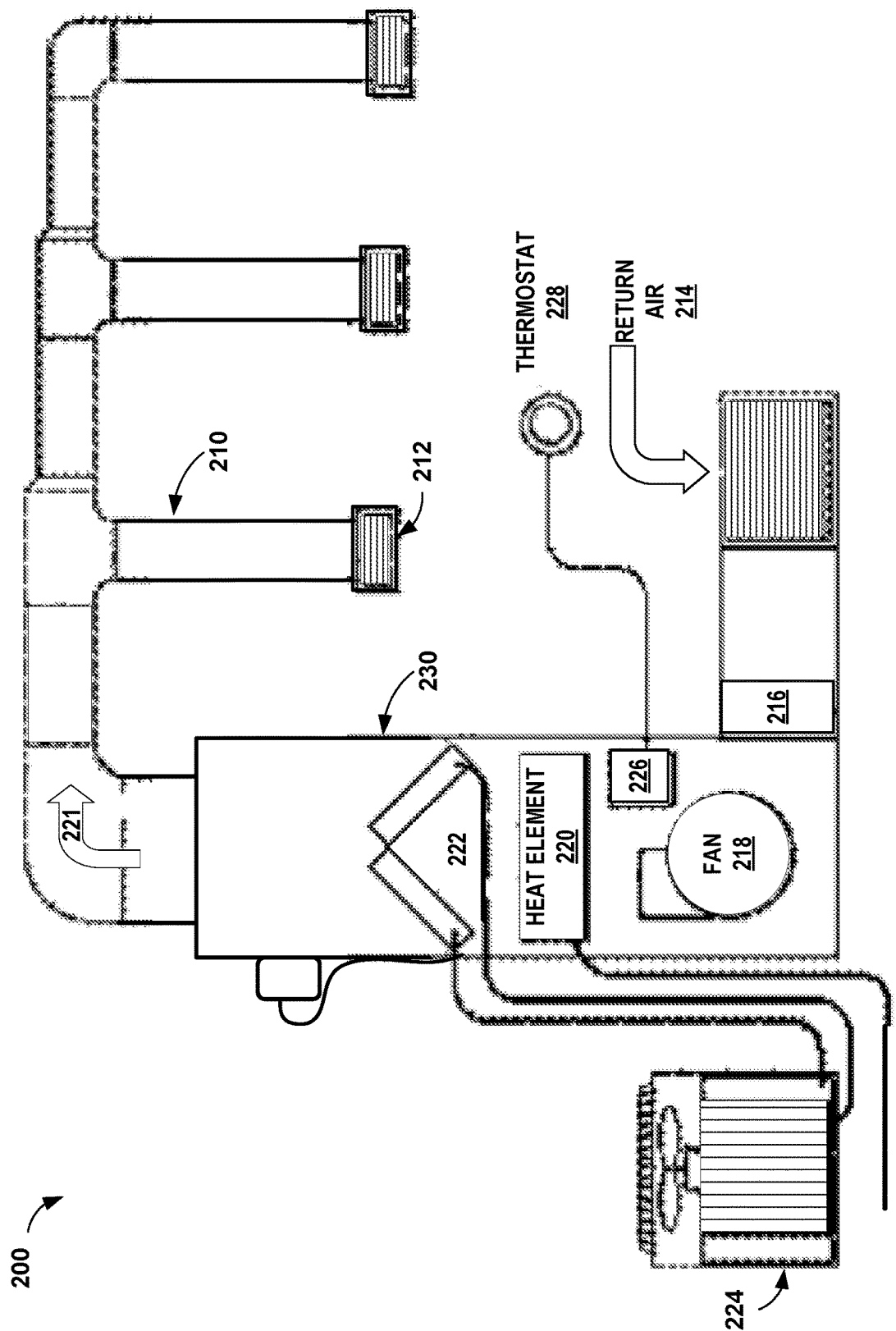
FIG. 2 is a conceptual diagram illustrating and example environmental control system according to one or more techniques of this disclosure.

FIG. 2 is a conceptual diagram illustrating and example environmental control system according to one or more techniques of this disclosure. The example of system 200 is one possible arrangement for a forced air HVAC system. In other examples, system 200 may include more or fewer components and a different arrangement of components. System 200 is an example of HVAC system 100 described above in relation to FIG. 1 and may include the same or similar functions and characteristics.

The example of system 200 include heat exchanger housing 230 (housing 230 for short), return air duct 214, compressor assembly 224, filter 216, thermostat 228, one or more control boards 226, and registers 212. System 200 may be installed in a residential or commercial building to heat, cool, filter, remove humidity and circulate air within the building. Thermostat 228 is an example of thermostat 150 described above in relation to FIG. 1 and may include the same functions and characteristics. Thermostat 228 may also be referred to as an HVAC controller or a smart thermostat in this disclosure.

Housing 230 may include one or more heat exchangers such as A-type exchanger 222 and heat element 220 as well as fan 218. Housing 230 may include other components not shown in FIG. 2, such as an induction blower, pressure switches or sensors, humidity sensors and similar components. Housing 230 may direct an air stream 221 received from return air duct 214, through fan 218, and the one or more heat exchangers to distribution duct 210. Fan 218 may be one of the HVAC loads connected to thermostat 228, as described above in relation to FIG. 1.

Fan 218 receives an air stream 221 from an inside space of a building or other structure via return air duct 214 and filter 216. Fan 218 may also be referred to as a circulation blower to differentiate fan 218 from an induction blower. In some examples, air from outside the structure may also be directed to either or both of return air duct 214 and to the induction blower (not shown in FIG. 2). Fan 218 may pressurize air stream 221 such that air stream 221 is forced through the heat exchangers and through distribution ducts to registers 212.

Heat element 220 may be an HVAC load connected to and controlled by thermostat 228 as described above in relation to FIG. 1. Heat element 220 may be any of an electric heat element, a gas furnace, a heat exchanger as part of a heat pump, or any other type of heat exchanger. In the example of a heat pump, such as a geothermal heat pump, heat element 220 may be used to reduce the temperature of air stream 221 flowing through heat element 220, as well as to raise the temperature of air stream 221. Heat element 220 may receive electric power, in the example of a resistive electric heating element, or a combustible gas, such as propane or natural gas, in the example of a gas furnace.

In some examples, system 200 may include more than one heat element, such as an electric heat element and a gas furnace. The heat element may be one HVAC load and the gas furnace a second HVAC load connected to and controlled by thermostat 228. In other examples, system 200 may include a multi-stage heating system in which each stage is a separate HVAC load connected to thermostat 228. As described above in relation to FIG. 1, the load sensing functions of thermostat 228 may determine which loads connect to thermostat 228 and perform and processing circuitry of thermostat 228 may execute instructions stored at a memory location to perform initial setup steps to configure thermostat 228 based on the detected loads (not shown in FIG. 2). In the example of a heat pump, thermostat 228 may detect a heat pump and may ask questions via a user interface to determine the type of heat pump, e.g., a geothermal type or the air exchanger compressor type such as compressor assembly 224. In some examples, thermostat 228 may perform tests to determine how the reversing valve is configured for the heat pump, e.g., whether energizing the reversing valve performs a cooling function or energizing the reversing valve performs a heating function. In other examples, the processing circuitry of 228 may present questions via the user interface to ask the user which way the reversing valve is configured.

A-type heat exchanger 222 may connect to compressor assembly 224. In some examples, compressor assembly 224 may be configured as a heat pump, while in other examples compressor assembly 224 may be configured as the outdoor portion of an air conditioning (A/C) unit. In the example of a heat pump, A-type heat exchanger 222 may either cool and remove moisture from air stream 221 or increase the temperature of air stream 221 as it passes through A-type heat exchanger 222. In the example of an A/C unit, A-type heat exchanger 222 may only reduce the temperature and condense moisture from air stream 221. In some examples housing 230 may include a drain tray and drain configured to capture moisture condensed from air stream 221 by A-type heat exchanger 222 and convey the liquid moisture outside of housing 230 (not shown in FIG. 2).

Compressor assembly 224 may include a blower or fan to draw air through a heat exchanger, which may be placed around the periphery of compressor assembly 224. Compressor assembly 224 may also include a motor to drive the fan, a compressor, one or more controllers, valves, sensors including temperature and pressure sensors and other components that may not be shown in FIG. 2.

Control board 226 may include one or more processors configured to receive signals from rooms within the inside space of the building, such as via one or more sensors within thermostat 228 as well as remote sensors separate from thermostat 228 (not shown in FIG. 2). Control board 226 may also receive signals from sensors within system 200 such as furnace temperature, air stream humidity, pressure and temperature sensors, flame sensors, and similar sensors concerned with the safe and efficient operation of system 200. Control board 226 may also be configured to receive data from a network via a wired or wireless connection with information such as temperature, humidity and other weather conditions outside the building, commands to adjust the operation of system 200, and similar data.

Examples of sensors may include temperature sensors, humidity sensors, occupancy sensors and similar sensors that determine environmental conditions of a room in the building and provide information to control board 226 to configure and control the operation of system 200. In some examples, remote sensors may be operatively coupled thermostat 228 and send signals with raw information such as the temperature of a room in the building. As described above in relation to FIG. 1, thermostat 228 may send signals to control board 226 to turn on or off the HVAC loads, e.g., heating, air conditioning or ventilation functions of system 200.

Distribution duct 210 in the example of system 200 is an HVAC duct configured to convey air to an inside space of a structure. Distribution duct 210 may include other HVAC loads, such as an air handler, or air flow valves (not shown in FIG. 2) that may control to which registers 212 air stream 221 will flow. Air flow valves may also be referred to as baffles or controllable registers in this disclosure. In some examples registers 212 may be controllable, e.g., manually, by control board 226 or some other controller, to restrict or allow air flow into a room.

Filter 216 may be configured to remove contaminants from air stream 221. Filter 216 may include a structural support layer and one or more other layers configured to remove dust, allergens, and other particulates from air stream 221. In some examples 216 may be configured as an electrostatic filter and controlled by thermostat 228 as an HVAC load.

Figure 3:
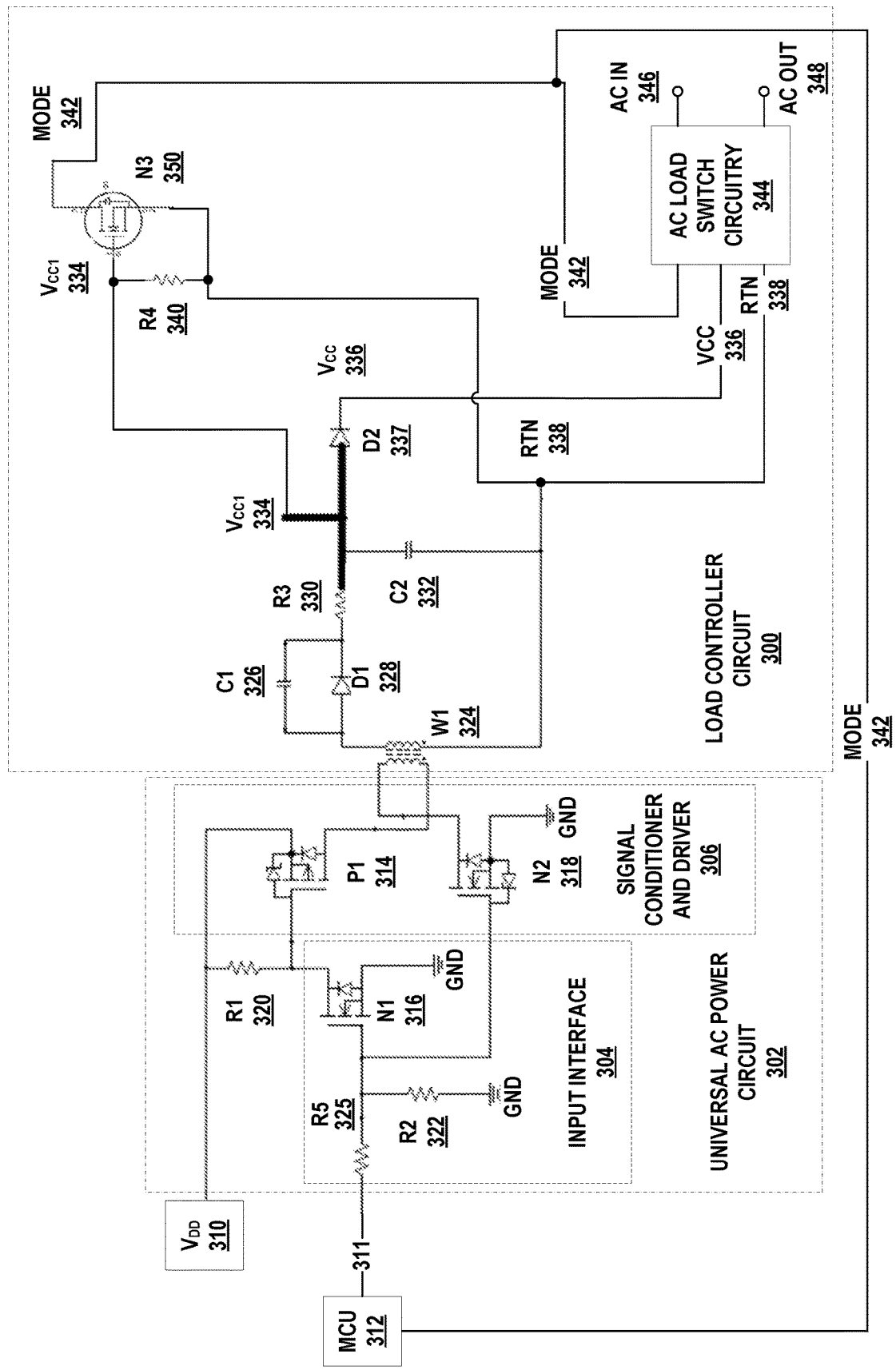
FIG. 3 is a schematic diagram illustrating an example implementation of the universal AC switching circuit of this disclosure.

FIG. 3 is a schematic diagram illustrating an example implementation of the universal AC switching circuit of this disclosure. The schematic diagram of load controller circuit 300 of FIG. 3 illustrates some examples of circuit implementations of portions of thermostat 150 and thermostat 228 described above in relation to FIGS. 1 and 2. In other examples, the functions thermostats 150 and 228 may be implemented using a different arrangement of circuitry, including logic circuits, processing circuitry executing firmware or software, and similar implementations.

In the example of FIG. 3, universal AC power circuit 302 receives pulse modulated drive signal 311 from processing circuitry, shown as MCU 312, and receives power from power supply Vdd 310. While MCU 312 outputs drive signal 311, universal AC power circuit 302 may provide power to the Vcc terminal, Vcc 336, of AC load switch circuitry 344 via Vcc1 334. As described above in relation to FIG. 1, MCU 312 may output drive signal 311 when MCU 312 determines that the power stealing element of AC load switch circuit 344 are not sufficient to power AC load switch circuit 344, e.g., based on the type of load connected to AC out 348 and/or based on whether the power stealing element raises the voltage at Vcc 336 above a threshold voltage. Universal AC power circuit 302 and AC load switch circuitry 344 are examples of universal AC power circuit 102 and AC load switch circuitry 106 described above in relation to FIG. 1 and may have the same or similar functions and characteristics.

In the example implementation of FIG. 3, universal AC power circuit 302 includes input interface 304 and signal conditioner and driver 306 connected to input interface 304. The output of signal conditioner and driver 306 connects to isolation transformer W1 324. Isolation transformer W1 324 is an example of isolation circuit 104 described above in relation to FIG. 1. In other examples, universal AC power circuit 302 may be implemented as an isolated power converter, e.g., a flyback power converter, implemented as a switched capacitor network, or other examples of circuitry that may receive a drive signal and provide output power.

Input interface 304 include resistors R5 325 and R22 322, which form a resistor divider that receives drive signal 311. A first terminal of R5 325 connects to drive signal 311, a second terminal of R5 325 connects to the gate of N-type metal oxide semiconductor field effect transistor (MOSFET) N1 316. Resistor R2 322 connects the gate of N1 316 to ground. The gate of N1 316 also connects to the gate of N-type MOSFET N2 318 of signal conditioner 306. The source of N1 316 connects to ground. The drain of N1 316 connects to the gate of P-type MOSFET P1 314 of signal conditioner 306 and to Vdd 310 through resistor R1 320. Though shown as MOSFETs in input interface 304 and signal conditioner and driver 306, the transistors of universal AC power circuit 302 may implemented using other types of switches, e.g., bipolar junction transistors (BJT) and may be implemented in other arrangements to provide similar functions, for example, by replacing the N-type transistors with P-type transistors, and vice versa, and rearranging the connections of Vdd 310 and ground.

The source of P1 314 connects to Vdd 310 and the drain connects to a first terminal of a primary winding of isolation transformer W1 324. In some examples, a Zener diode may connect the gate of P1 314 to the source of P1 314 by connecting the cathode of the Zener diode to the source of P1 314 and the anode to the gate of P1 314. The drain of N2 318 connects to a second terminal of the primary winding of isolation transformer W1 324. In some examples, an internal Zener diode, or similar protective device, may connect the gate of N2 318 to the source of N2 318 by connecting the cathode of the Zener diode to the gate of N2 318 and the anode to the source of N2 318 to provide ESD protection.

In other words, input interface 304 includes an input for receiving drive signal 311. In the example of FIG. 3, the input is a resistor divider made up of R5 325 and R2 322. The input of input interface 304 connects to the control terminal, e.g., the gate, of N1 316 such that the gate of N1 316 receives drive signal 311. In some examples, drive signal 311 may be a pulse width modulated (PWM) signal with a predetermined duty cycle. MCU 312 may output a duty cycle to provide sufficient power from universal AC power circuit 302 to operate load controller circuit 300, and one or more additional load controllers, as described above in relation to FIG. 1. In some examples, the duty cycle of drive signal 311 may be less than ten percent, more than ten percent, or any other value as needed to operate load controller 300. The frequency of drive signal 311 may depend on the characteristics of MCU 312, the transistors of universal AC power circuit 302 and other components. In some examples the frequency of drive signal 311 may be between 20 kHz to 100 kHz, e.g., approximately 50 kHz.

Signal conditioner and driver 306 may be described as a dual channel circuit, e.g., a first channel including P1 314 and a second channel including N2 318. The dual channel circuit of signal conditioner and driver 306 has a first input, e.g., the gate of P1 314, connected to an output of transistor N1 316, e.g., the drain of N1 316. A second input of signal conditioner and driver 306, e.g., the gate of N2 318, connects to the input of transistor N1 316. The connection to isolation transformer W1 324, may be described as a first end of the primary winding of W1 324 connected to a first output of the dual channel circuit, e.g., the drain of P1 314. A second end of the primary winding of W1 324 connected to a second output of the dual channel circuit, e.g., the drain of N2 318.

Isolation transformer W1 324 has a first end of a secondary winding connected to the reference terminal of AC load switch circuitry 344, e.g., RTN 338, and a second end of the secondary winding connected to a control terminal, e.g., the gate, of N-type MOSFET (NMOS) N3 350. The second end of the secondary winding connects the gate of N3 350 through diode D1 328 and resistor R3 330. The secondary winding of W1 324 connects directly to a first terminal of capacitor C1 326 and the anode of D1 328. The cathode of D1 328, and a second terminal of C1 326 connects to a first terminal of R3 330. The second terminal of R3 330 connects to the anode of blocking diode D2 337 as well as Vcc1 334, which connects to the gate of N3 350 and a first terminal of resistor R4 340. R4 340 connects the gate of N3 350 to the source of N3 350, which also connects to RTN 338.

AC load switch circuitry 344 includes reference terminal, RTN 338, mode terminal 342, Vcc terminal 336, and a power stealing element (not shown in FIG. 3). As described above in relation to FIG. 1, AC load switch circuitry 344 may control the power to an HVAC load (not shown in FIG. 3) connected to AC out 348 from a transformer connected to AC in 346. The cathode of blocking diode D2 337 connects to Vcc 336. Capacitor C2 332 connects Vcc1 334 to RTN 338 and may also be referred to as the Vcc capacitor for the AC load switch.

In operation, MCU 312 may control the power stealing function, and load sense function of AC load switch circuitry 344 by outputting a logical HIGH or logical LOW via mode 342. In the example of FIG. 3, a logical HIGH may enable the power stealing function of the power stealing element while a logical LOW may disable the power stealing function. As described above in relation to FIG. 1, MCU 312 may determine that the power stealing element may not supply sufficient power to operate AC load switch circuitry 344, e.g., by digital communication from AC load switch circuitry 344, a signal from a VCC sampling circuit, or by other means (not shown in FIG. 3). For example, MCU 312 may receive an indication via digital communication that the power stealing element does not raise the voltage of Vcc 336 above a voltage threshold. MCU 312 may output drive signal 311, which may cause universal AC power circuit 302 to output power via isolation transformer W1 324. Power at Vcc1 334 connects to Vcc 336 via blocking diode D2 337 to provide power to AC load switch circuitry 344. Providing power to Vcc 336 via Vcc1 334 also drives the gate of transistor N3 350 high and switches ON N3 350.

Transistor N3 350 may be described as a mode switch because based on the signal to the gate of N3 350, transistor N3 350 may override the mode command 342 from MCU 312 to AC load switch circuitry 344. The control terminal of mode switch N3 350 is configured to control a connection between the mode terminal 342 and reference terminal RTN 338. Switching N3 350 ON, e.g., conducting current, connects mode 342 to RTN 338, which ties the mode terminal of AC load switch circuitry 344 LOW, disabling the power stealing element (not shown in FIG. 3) of AC load switch circuitry 344.

In some examples, when MCU 312 outputs drive signal 311, then MCU 312 will also output a logical LOW to mode 342. In some examples, noise or other interference may couple to the control lines carrying the mode signal from MCU 312 to mode terminal 342 of AC load switch circuitry 344. Mode switch N3 350 may ensure that mode terminal 342 is held low when universal AC power circuit 302 is providing power to Vcc1 334.

When the power stealing element of AC load switch circuitry 344 provides sufficient power, the voltage of Vcc 336 may be above a predetermined Vcc voltage threshold. AC load switch circuitry 344 or the VCC sampling circuitry (not shown in FIG. 3) may communicate with MCU 312 and MCU 312 may withhold drive signal 311. With Vcc 336 above the Vcc voltage threshold, and universal AC power circuit 302 not providing power, the magnitude of Vcc 336 may be greater than Vcc1 334 and blocking diode D2 337 may prevent the voltage at Vcc 336 from reaching isolation transformer W1 324.

In this manner, an HVAC controller of disclosure that includes universal AC power circuit 302 may start up using the power stealing element of AC load switch circuitry 344 and continue to use the power stealing function if the power stealing element can supply sufficient, stable power. If power stealing is not sufficient, which may be identified for example by the magnitude of voltage on Vcc 336 being too low or varying outside of a threshold range during operation, then universal AC power circuit 302 may supply power to load controller circuit 300. In other words, when functions performed by universal AC power circuit 302 is applied to a thermostat of this disclosure, load controller circuit 300, may be powered at any time for a variety of HVAC system configurations. In some examples, the power stealing function is disabled, so that it is not exposed to voltage and current peak and can operate reliably in some HVAC systems. In addition, this circuits of disclosure are designed for low power consumption, so can be applied to battery operated thermostats.

Figure 4:
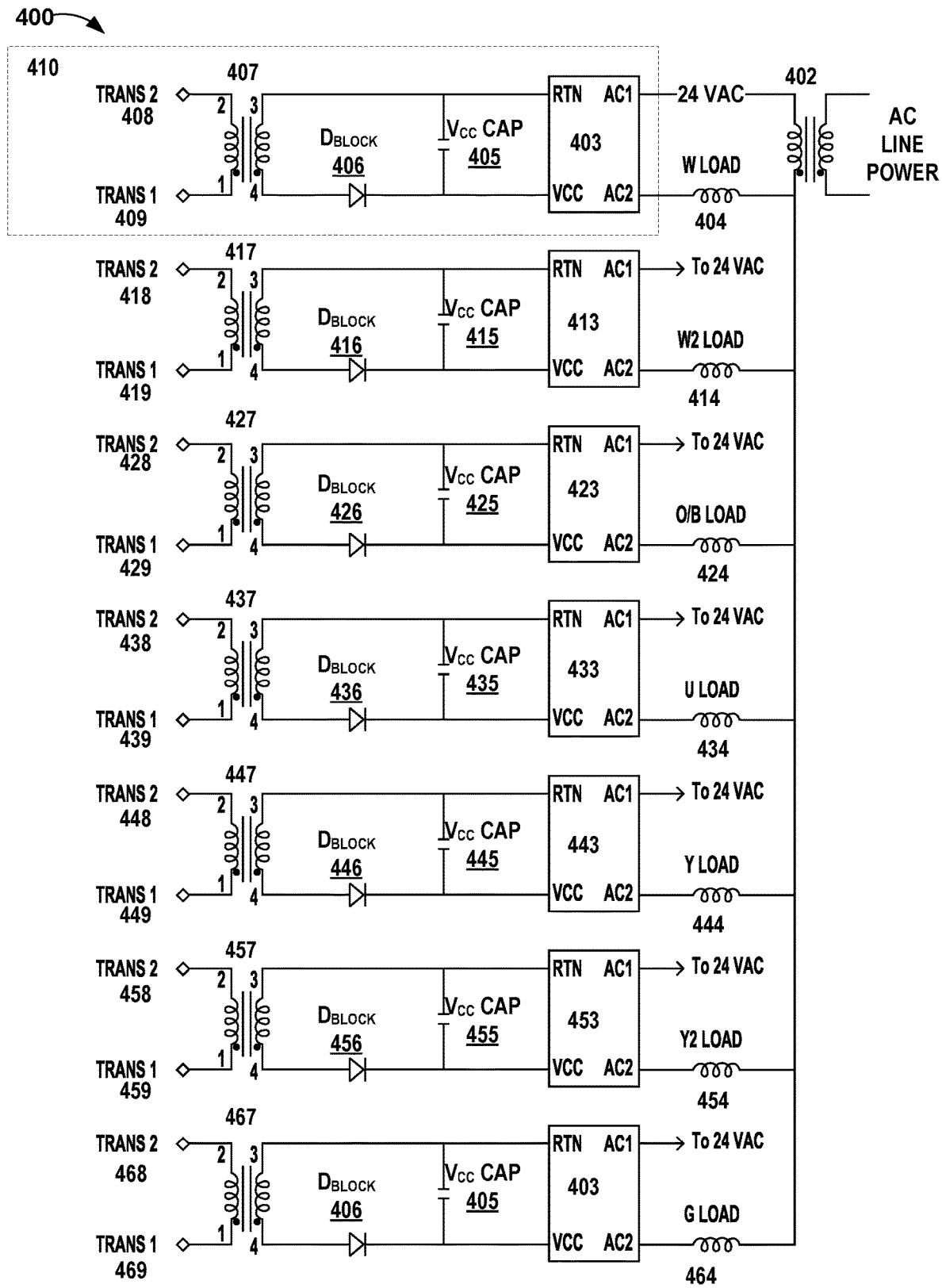
FIG. 4 is a schematic diagram illustrating example isolation and AC load switch circuitry of this disclosure for multiple loads of an HVAC system.

FIG. 4 is a schematic diagram illustrating example isolation and AC load switch circuits of this disclosure for multiple loads of an HVAC system. The example of system 400 of FIG. 4 illustrates examples of load controller circuitry A 110 through load controller circuitry N 114 described above in relation to FIG. 1 and of load controller 300 described above in relation to FIG. 3 and may have similar functions and characteristics. Some components described above in FIGS. 1 and 3 have been deleted from FIG. 4 to simplify the description.

The example of system 400 illustrates a variety of loads, each controlled by separate AC load switch circuitry. Specifically, AC load switch circuitry 403 controls W load 404, AC load switch circuitry 413 controls W2 load 414, AC load switch circuitry 423 controls O/B load 424, AC load switch circuitry 433 controls U load 434, AC load switch circuitry 443 controls Y load 444, AC load switch circuitry 453 controls Y2 load 454 and AC load switch circuitry 463 controls G load 464. A thermostat, such as thermostat 150 and thermostat 228 described above in relation to FIGS. 1 and 2, may be configured to connect to any number of HVAC loads. In other examples, a thermostat according to one or more techniques of this disclosure may include more or fewer loads than shown in FIG. 4.

To simplify the description, load controller circuit 410 will be described in detail. The other load controller circuits for HVAC loads W2 414 to load G 464 are connected in the same manner. Load controller circuit 410 may connect to the outputs of a dual channel circuit, such as signal conditioner and driver 306 described above in relation to FIG. 3, at terminals TRANS2 408 and TRANS1 409. Terminals TRANS2 408 and TRANS1 409 connect to the primary winding (e.g., between 1 and 2) of isolation transformer 407. Isolation transformers 407 through 467 are examples of isolation transformer W1 324 described above in relation to FIG. 3 and of isolation circuit 104 described above in relation to FIG. 1. In some examples, each isolation transformer 407 through 467 may connect in parallel to signal conditioner and driver 306 of universal AC power circuit 302 or of universal AC power circuit 102 depicted in FIGS. 1 and 3. In other examples two or more universal AC power circuits may supply one or more load controller circuits. Each isolation transformer 407 through 467 may ensure that the reference terminals, RTN, of each respective load controller is isolated from all other load controllers.

A first end of the secondary winding (3) of isolation transformer 407 may connect to the RTN terminal (reference terminal) of AC load switch circuitry 403. A second end (4) of the secondary winding of isolation transformer 407 may connect to the Vcc terminal through blocking diode Dblock 406. That is, the anode of Dblock 406 connects to the second end of the secondary winding, while the cathode of Dblock 406 connects to the Vcc terminal. Vcc capacitor 405 connects the Vcc terminal to the RTN terminal. Each Vcc terminal depicted in FIG. 4 is an example of Vcc 336 described above in relation to FIG. 3. Similarly, each reference terminal, RTN is an example of RTN 338 described above in relation to FIG. 3.

In operation, the thermostat that includes system 400 may include load sensing circuitry and a power stealing element in each of AC load switch circuitry 403 through 463. When initially connecting a thermostat including system 400 to the HVAC loads, the load sensing circuitry may determine whether there is a load connected to the AC2 connection of each of AC load switch circuitry 403 through 463. A user, such as an HVAC technician, or other user, may connect the field wires from the HVAC loads to field wire terminals on the thermostat. Once each load is connected, a respective power stealing element, which may include circuitry components configured for power stealing (not shown in FIG. 4), may begin powering each load controller, which may include charging each respective Vcc capacitor, e.g., Vcc capacitor 405. Vcc capacitor 405 may also be described as an electrical energy storage device or an electrical power storage device. The power stealing element may charge Vcc capacitor 405 to a voltage above a threshold voltage. Table 1 lists some examples of HVAC loads:

TABLE 1

HVAC Loads

| Signal ID | Wire Color Code | Description |
| --- | --- | --- |
| R or Rh | Red | Power, 24 Vac transformer |
| Rc | Red | Power - cooling, 24 Vac transformer, dual transformer systems |
| C | Black/Blue | Common of 24 Vac transformer |
| W, W1 or W2 | White | Primary heat call relay. W1 and W2 for multiple stage systems |
| E | Brown | Emergency heat relay |
| Y or Y1 | Yellow | Primary cooling call relay |
| Y2 | Yellow | Secondary cooling call relay |
| G | Green | Fan relay |
| O | Orange | Heat Pump Reversing Valve - cooling |
| B | Blue | Heat Pump Reversing Valve - heating |
| U | | Humidifier, Dehumidifier, or Ventilator |

Transformer 402 may receive line power, as described above in relation to FIG. 1 and output a lower voltage to each AC1 terminal of each AC load switch circuitry 403 through 463. For example, in parts of North America, transformer 402 may receive line voltage of approximately 115-120 VAC. In the example of FIG. 4, transformer 402 provides 24 VAC power to each AC1 terminal. In other examples, transformer 402 may output a different magnitude of AC power. The AC1 terminal is an example of AC in 132 of AC load switch circuitry 106, described above in relation to FIG. 1. The output, AC2 of each AC load switch circuitry 403 through 463 is an example of AC out 130 depicted in FIG. 1. Each AC load switch circuitry 403 through 463 may control the operation of HVAC loads 404 through 464 by connecting or disconnecting the 24 VAC power supplied to the AC1 to each respective load via the AC2 terminal based on commands, e.g., control signals, from processing circuitry, such as processing circuitry 140 described above in relation to FIG. 1. In some examples, system 400 may include a second transformer, e.g., a dual transformer system including a heating load transformer (Rh) and a cooling load transformer (Rc).

In the example of load controller 410, after connecting field wires for W load 404, AC load switch circuitry 403 may detect whether there is a load, e.g., a heating load such as a furnace, electric heating element, a heat pump and so on.

Power stealing circuitry of AC load switch circuitry 403 may provide power to load controller 410, which may raise the magnitude of the voltage on the Vcc terminal above a Vcc voltage threshold. As described above in relation to FIG. 1, in some examples, communication circuitry of AC load switch circuitry 403 may send digital communication to the processing circuitry of the thermostat indicating that a heating load is present and connected as W load 404 and that the power stealing circuitry is providing sufficient power. In examples in which AC load switch circuitry 403 does not include digital communication capability, a Vcc detection circuit (not shown in FIG. 4), e.g., Vcc sampling circuit 108 depicted in FIG. 1, may indicate whether or not the power stealing element provides enough power to operate load controller circuit 410.

In some examples, the processing circuitry may determine that the power stealing circuitry may not output sufficient power. For example, W load 404 may include a thermopile, as described above in relation to FIG. 1. In some examples, a lower power source, such as a thermopile may not provide enough power for AC load switch circuitry 403 to send a digital communication to the processing circuitry, even when AC load switch circuitry 403 includes communication capability. When the processing circuitry receives an indication that the power stealing circuitry may not output sufficient power, the processing circuitry may output a drive signal to a universal AC power circuit, such as universal AC power circuit 102 and 302 depicted in FIGS. 1 and 3. The universal AC power circuit may output power to isolation transformer 407 to provide power to the Vcc terminal of AC load switch circuitry 403. The power provided by the universal AC power circuit may charge Vcc capacitor 405. Similarly, the power provided by the universal AC power circuit may, in parallel, charge the Vcc capacitor for each respective load controller circuit of system 400.

In this manner once the wire detection is complete and the processing circuitry has received an indication of which HVAC loads are connected and which loads are not connected the universal AC circuit provides power to the load controllers when triggered by the drive signal from the processing circuitry. As described above in relation to FIG. 3, each load controller may receive power via a Vcc1 node (not shown in FIG. 4). When the voltage at Vcc1 goes high, the voltage may turn on a respective mode switch, e.g., like transformer N3 350 depicted in FIG. 3, which pulls the mode terminal LOW. In other words, the mode switch may time the mode terminal to the reference terminal RTN, and the Vcc terminal gets power from Vcc1 via the universal AC circuit. FIG. 3. In some examples, the indication from each load controller circuit regarding whether (a) a load is connected and (b) the power stealing function provides sufficient power, may cause processing circuitry to set one or more registers at a memory location connected to the processing circuitry. As the processing circuitry progresses through the setup process, the processing circuitry may read a register during power up and setup to determine which loads are connected. Then the processing circuitry may cause the universal AC circuit to turn off power stealing and provide power, e.g., at Vcc1. As described above in relation to FIG. 3, the processing circuitry may also independently control the mode terminal for each AC load switch in each load controller circuit. Processing circuitry may execute the setup process when initially connected to an HVAC system, or when changes occur, such as adding or removing an HVAC load from the HVAC system.

In other examples, not shown in FIG. 4, the load controller circuitry including isolation transformer 407 connected to a universal AC power circuit, may only be implemented on one or more of the most sensitive HVAC loads. For example, the heating load, W load 404 may be more sensitive to variations in power stealing power output when compared to other types of loads such as G load 464 (fan). That is, W load 404 may include a low power thermopile, as described above. Other HVAC loads may supply enough electrical energy for the power stealing functions of the load controller circuits to provide power. Therefore, other load controller circuits connected to other HVAC loads may not include an isolation transformer or a blocking diode. Instead, HVAC loads, such as OB load 424, Y load 444, Y2 load 454, may depend solely on power stealing circuitry of the respective AC load switch circuitry to operate.

Figure 5:
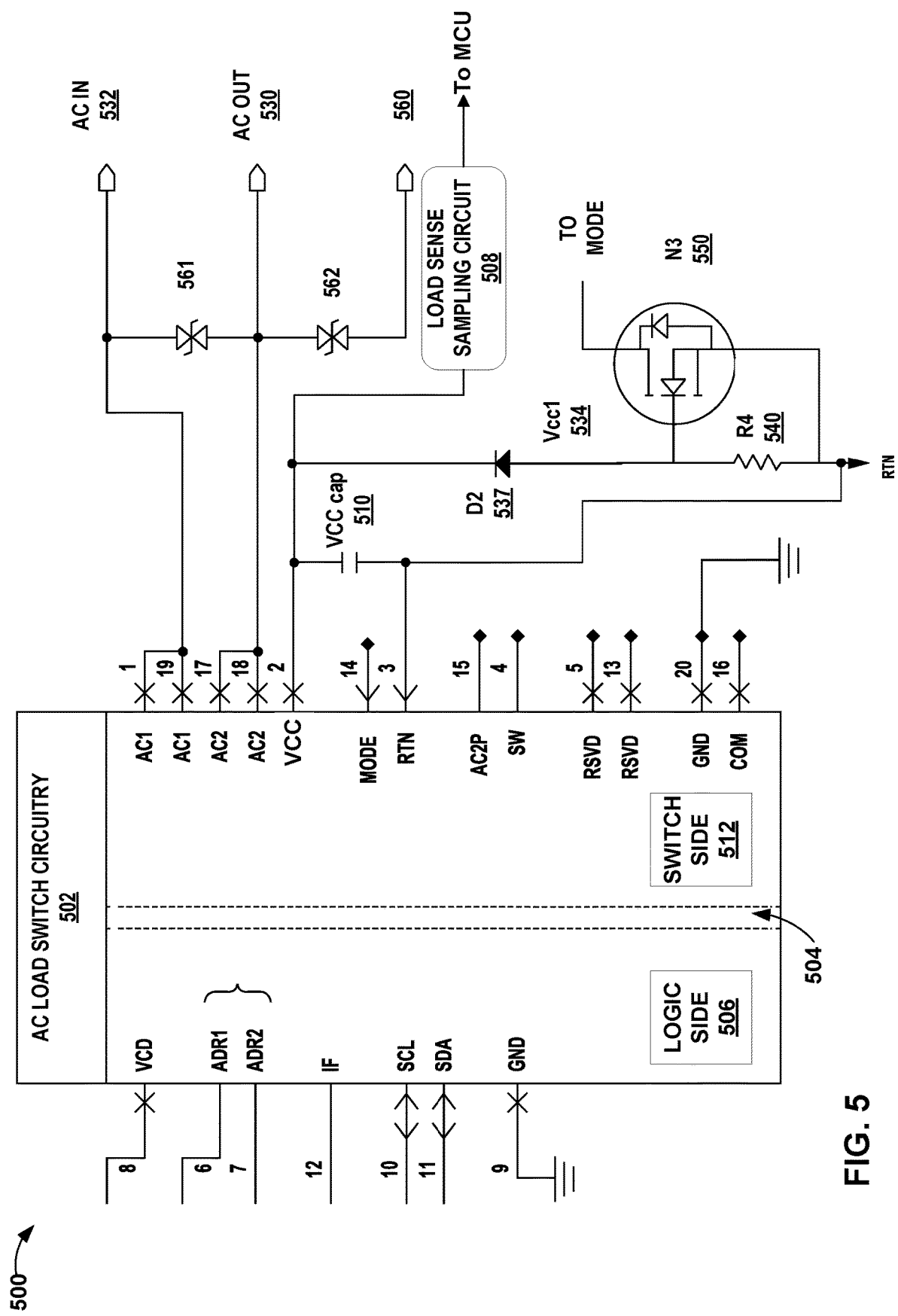
FIG. 5 is a conceptual diagram illustrating an example integrated circuit implementation of the AC load switch circuitry of this disclosure.

FIG. 5 is a conceptual diagram illustrating an example integrated circuit implementation of the AC load switch circuitry of this disclosure. Circuit 500 in the example of FIG. 5 is an example of load controller circuit 300 described above in relation to FIG. 3 and may have the same or similar functions and characteristics. Circuit 500 is also an example of load controller circuit 110 depicted in FIG. 1 and load controller circuit 410 depicted in FIG. 4. Similarly, AC load switch circuitry 502 is an example of AC load switch circuitry 106 and 344 depicted in FIGS. 1 and 3.

In the example of FIG. 5, AC load switch circuitry 502 includes an isolation barrier 504 that isolates logic side 506 from switch side 512. In some examples, AC load switch circuitry 502 may also include isolated communication channels from the logic side 506 to the switch side 512. For example, Vcc (pin 2) may include voltage measurement circuitry that may provide an indication to logic side 506 of the magnitude of voltage on Vcc (pin 2), or whether the magnitude of voltage on Vcc (pin 2) exceeds a threshold. In some examples, logic side 506 may include processing circuitry (not shown in FIG. 5) including a microprocessor, logic circuits, and so on as described above in relation to processing circuitry 140 of FIG. 1.

On logic side 506, AC load switch circuitry 502 may include VCD terminal (pin 8), a two-bit address terminals ADR1 (pin 6) and ADR2 (pin 7), IF terminal (pin 12), digital communication terminals SCL (pin 10) and SDA (pin 11), and a ground terminal (pin 9). In the example of FIG. 5, the digital communication terminals may use I²C communication protocol, e.g., to communicate with processing circuitry, such as MCU 312 depicted in FIG. 3. For example, SCL pin 11 may connect to a serial clock line and SDA pin 10 may connect to a serial data line. The I²C protocol is a master-slave protocol in which data is transferred in messages broken into frames of data. Each message may have an address frame that contains the binary address of the slave, and one or more data frames that contain the data being transmitted. The I²C message may also include start and stop conditions, read/write bits, and ACK/NACK bits between each data frame. In other examples, AC load switch circuitry 502 may communicate using other communication protocols such as the SPA bus asynchronous protocol, CAN bus, or other communication protocols. In other examples, as described above in relation to FIG. 1, AC load switch circuitry 502 may not include digital communication capability and may send and receive signals directly to the processing circuitry or depend on secondary circuits such as load sense sampling circuit 508. In some examples, AC load switch circuitry 502 may include processing circuitry, as described above for processing circuitry 140 in relation to FIG. 1.

As described above in relation to FIGS. 1, 3 and 4, the switch side 512, may include an AC in terminal 532, which connects to AC1 (pins 1 and 19), an AC out terminal 530, connected to AC2 (pins 17 and 18), Vcc (pin 2), mode (pin 14), RTN, or reference terminal (pin 3), AC2P (pin 15), SW (pin 4), RVSD (pins 5 and 13), ground (pin 20) and common (pin 16). In other examples, AC load switch circuitry 502 may include more or fewer terminals, and other terminal arrangements. Terminal 560 connects to AC out 530 through 562. AC in 532 connects to AC out 530 through 561.

Vcc capacitor 510 connects Vcc (pin 2) to RTN (pin 3), as described above in relation to FIGS. 1 and 4. Blocking diode D2 537 connects Vcc1 534 to Vcc (pin 2). Resistor R4 540 connects the gate of mode switch N3 550 to RTN (pin 3). The drain of N3 550 connects to the mode terminal (pin 14). As described above in relation to FIG. 1, mode switch N3 550 may ensure the mode terminal (pin 14) is held low and power stealing is disabled when Vcc1 534 provides power from the universal AC power circuit.

Load sense sampling circuit 508 is an example of Vcc sampling circuit 108 described above in relation to FIG. 1. Load sense sampling circuit 508 may detect the voltage at Vcc (pin 2) and send an indication to the processing circuitry, e.g., MCU 312, in examples in which AC load switch circuitry 502 does not have digital communication capability or may not have enough power to use the digital communication.

Figure 6:
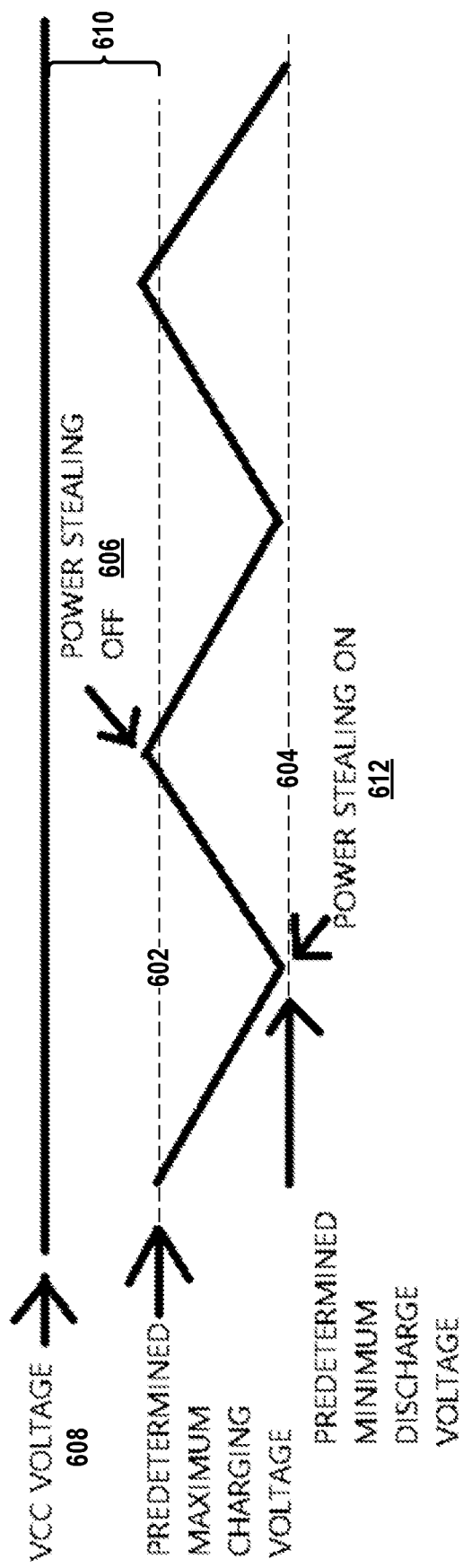
FIG. 6 is a timing diagram illustrating an example operation of the power stealing circuitry of AC load switch circuitry of this disclosure.

FIG. 6 is a timing diagram illustrating an example operation of the power stealing circuitry of the AC load switch circuitry of this disclosure. The power stealing element for a given HVAC load may operate, e.g., the processing circuitry of a thermostat of this disclosure, e.g., thermostat 150 described above in relation to FIG. 1, outputs a logical HIGH on the mode line and does not output the drive signal.

When the power stealing element draws power from the HVAC load, the power stealing element may charge the Vcc capacitor, e.g., Vcc capacitors 510 and 405 described above in relation to FIGS. 5 and 4, respectively. In some examples, when the magnitude of voltage on the Vcc capacitor drops below a predetermined minimum discharge voltage threshold 604, the power stealing element may turn on (612) and increase the voltage on the Vcc capacitor. When the VCC charging voltage reaches the predetermined maximum charging voltage threshold 602, the power stealing element may stop charging the Vcc capacitor. When this charged voltage falls back to the predetermined minimum discharge voltage threshold 604, power stealing element may start charging again, and repeats it while the AC load switch circuitry operates to obtain the required energy from the HVAC load.

In other examples, the universal AC power circuit may be configured to power to Vcc via Vcc1 such that the Vcc voltage 608 is set to be at a voltage margin 610 above the predetermined maximum charging voltage threshold 602. For example, the power stealing function is always disabled when VCC voltage 608 remains at least two volts (2V) of voltage margin 610 above predetermined power maximum charging voltage threshold 602. The two volts is simply one example of voltage margin 610. The power stealing element may be configured with any voltage margin. For example, when processing circuitry 140 outputs drive signal 146, as described above in relation to FIGS. 1, 3 and 5, universal AC power circuit 102 may output Vcc such that the voltage magnitude is at least Vcc voltage 608.

Figure 7:
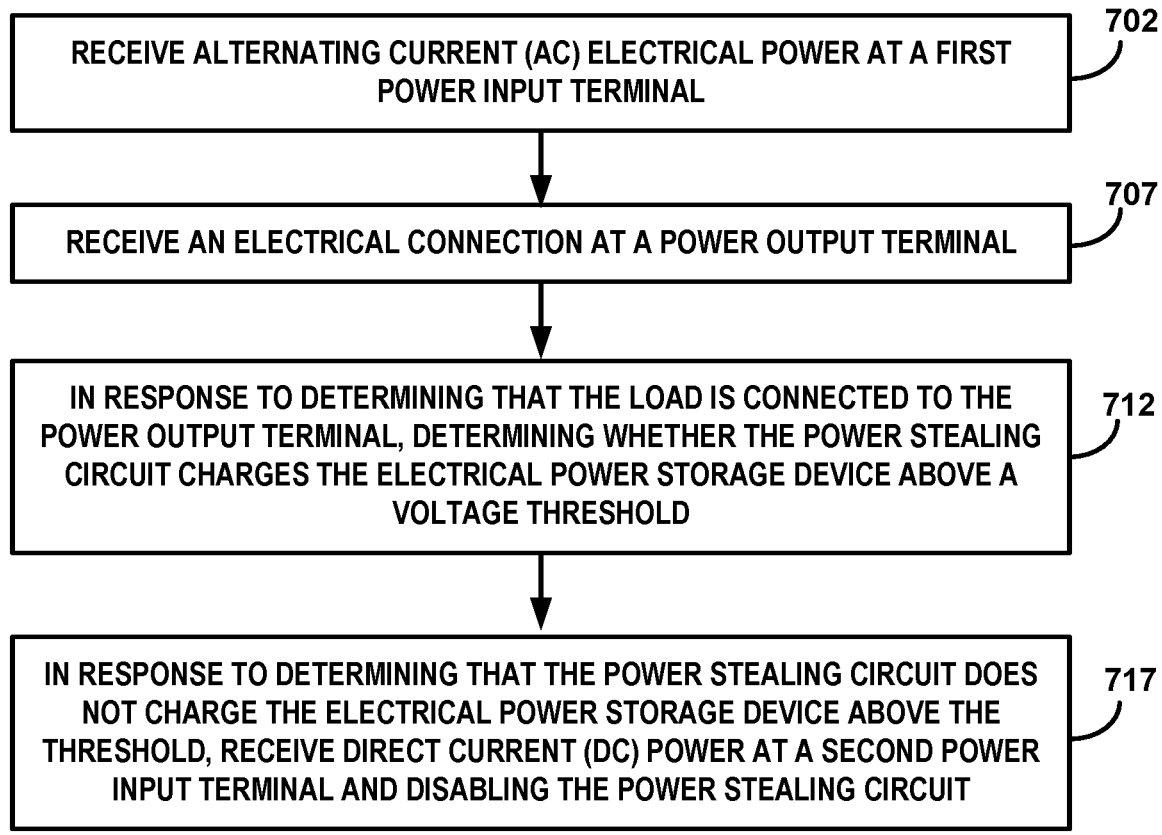
FIG. 7 is a flow chart illustrating an example operation of the load controller circuitry of this disclosure.

FIG. 7 is a flow chart illustrating an example operation of the load controller circuitry of this disclosure. The blocks of FIG. 7 will be described in terms of FIG. 3, unless otherwise noted.

As seen in the example of FIG. 7, AC load switch circuitry 344 of load controller circuit 300 may receive AC electrical power at a first power input terminal AC in 346, e.g., from a line transformer such as transformer 120 described above in relation to FIG. 1 (702). As shown in FIG. 4, the line transformer may also supply AC electrical power to several other load controller circuits that control the operation of separate HVAC loads.

During setup, e.g., initial installation, or after changes to the HVAC system, AC load switch circuitry 344 may receive an electrical connection at power output terminal, AC out 348 (707). In some examples the field wires connected to the power output terminals of one or more load controllers may have a load attached. In other examples, though AC load switch circuitry 344 may receive an electrical connection from a field wire, there may be no load connected. AC load switch circuitry 344 may further include load sensing circuitry. For example, once connected to a load, the power stealing element may begin siphoning power to begin powering AC load switch circuitry 344. The power stealing element may raise the voltage at Vcc 336 above a first voltage threshold, as well as charging the Vcc capacitor that may connect to Vcc 336. When MCU 312 receives the indication that the voltage at Vcc 336 is above the first threshold, MCU 312 may determine that a load is connected.

Further, AC load switch circuitry 344 may, in response to determining that the HVAC load is connected to power output terminal AC out 348, AC load switch circuitry 344 may determine whether the power stealing circuit charges the electrical power storage device, e.g., the Vcc capacitor, above a second voltage threshold (712). The second voltage threshold may be a greater magnitude than the first voltage threshold.

AC load switch circuitry 344 may, in response to determining that the power stealing circuit does not charge the electrical power storage device above the second threshold, receive DC power from universal AC power circuit 302 at a second power input terminal, e.g., at Vcc 336, via Vcc1 334. MCU 312 may output a logical LOW to mode 342, which may disable the power stealing circuit (717). Also, by raising the voltage at Vcc1 334, mode switch N3 350 may close and tie mode 342 to RTN 338, which will also disable the power stealing circuit.

In one or more examples, the functions described above may be implemented in hardware, software, firmware, or any combination thereof. For example, the various components of FIGS. 1 and 2, such as processing circuitry 140, AC load switch circuitry 106, and load controller circuitry N 114 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache).

By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," and processing circuitry as used herein, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described by the following examples:

Example 1

A heating, ventilation and air conditioning (HVAC) controller includes an alternating current (AC) load switch circuit comprising a first power input terminal, a second power input terminal, a power output terminal, and a power stealing element, the AC load switch circuit configured to: receive AC power at the first power input terminal; determine whether an HVAC load is connected to the power output terminal; siphon electrical power, with the power stealing element, from the HVAC load when the HVAC load is connected to the power output terminal; a power converter circuit configured to receive a drive signal and in response to receiving the drive signal, output electrical power to the second power input terminal; processing circuitry operatively coupled to a memory; the processing circuitry configured to: receive an indication of whether the HVAC load is connected to the power output terminal; receive an indication of whether a voltage magnitude at the second power input terminal is above a threshold voltage; in response to determining that: the HVAC load is connected to the power output terminal, and the voltage magnitude at the second power input terminal is less than a voltage magnitude; output the drive signal to the power converter circuit.

Example 2

The controller of example 1, wherein the AC load switch circuit is further configured to control operation of the HVAC load based on commands from the processing circuitry.

Example 3

The controller of example 2, wherein the HVAC controller further comprises one or more sensors, and wherein the processing circuitry is configured to send commands to the AC load switch circuit based on comparing indications received from the one or more sensors to a setpoint stored at the memory.

Example 4

The controller of any combination of examples 1 through 3, wherein the processing circuitry is configured to receive the indication of whether the voltage magnitude at the second power input terminal is above the threshold voltage based on a digital message from the AC load switch circuit.

Example 5

The controller of any combination of examples 1 through 4, further comprising a voltage sampling circuit configured to determine the voltage at the second power input terminal, and wherein the processing circuitry is configured to receive the indication of whether the voltage magnitude at the second power input terminal is above the threshold voltage from the voltage sampling circuit.

Example 6

The controller of any combination of examples 1 through 5, wherein the processing circuitry is further configured to, in response to determining that the voltage magnitude at the second power input terminal is less than a voltage magnitude; output a mode signal, wherein the mode signal disables the power stealing element.

Example 7

The controller of any combination of examples 1 through 6, wherein the processing circuitry is further configured to in response to determining that the voltage magnitude at the second power input terminal is greater than the voltage magnitude, withhold the drive signal.

Example 8

The controller of any combination of examples 1 through 7, wherein the power stealing element is further configured to charge an electrical power storage device connected to the second power input terminal, and the electrical power storage device is a capacitor.

Example 9

A method includes receiving alternating current (AC) electrical power at a first power input terminal; receiving an electrical connection at a power output terminal; when a load is connected to the power output terminal, charging an electrical power storage device using power from the load, wherein a power stealing circuit obtains the electrical power to charge the electrical power storage device; in response to the load being connected to the power output terminal, determining a voltage level of the electrical power storage device; and in response to the power stealing circuit not charging the electrical power storage device above a threshold, receiving direct current (DC) power at a second power input terminal and disabling the power stealing circuit.

Example 10

The method of example 9, further comprising, in response to determining that the power stealing circuit does not charge the electrical power storage device above the threshold, outputting a digital message indicating that the power stealing circuit does not charge the electrical power storage device above the threshold.

Example 11

The method of examples 9 and 10, further comprising, in response to determining that the power stealing circuit does not charge the electrical power storage device above the threshold, receiving a mode signal, wherein the mode signal disables the power stealing circuit.

Example 12

The method of any combination of examples 9 through 11, further comprising, in response to determining that the power stealing circuit charges the electrical power storage device above the voltage threshold, controlling operation of the load using electrical power provided by the power stealing circuit.

Example 13

The method of any combination of examples 9 through 12, wherein the load is a heating, ventilation, and air conditioning (HVAC) load.

Example 14

The method of any combination of examples 9 through 13, wherein the electrical power storage device is a capacitor.

Example 15

A circuit includes an input interface; a signal conditioner and driver connected to the input interface; an isolation transformer connected to the signal conditioner and driver, an alternating current (AC) load switch circuit includes a reference terminal, a mode terminal, a Vcc terminal, and a power stealing element; and a mode switch comprising a control terminal configured to control a connection between the mode terminal and the reference terminal; wherein: the input interface comprises a transistor having an input for receiving a drive signal, the signal conditioner and driver comprise a dual channel circuit, the dual channel circuit has a first input connected to an output of the transistor, and a second input connected to the input of the transistor, the isolation transformer has a first end of a primary winding connected to a first output of the dual channel circuit and a second end of the primary winding connected to a second output of the dual channel circuit, the transformer has a first end of a secondary winding connected to the reference terminal of the AC load switch circuit and a second end of the secondary winding connected to the control terminal of the mode switch, and closing the mode switch disables the power stealing element of the AC load switch circuit.

Example 16

The circuit of example 15, wherein the drive signal comprises a pulse width modulated signal.

Example 17

The circuit of example 16, wherein the drive signal is defined by a duty cycle of less than ten percent.

Example 18

The circuit of any combination of examples 15 through 17, wherein the signal conditioner and driver comprise a first switch and a second switch, wherein: the first input comprises a control terminal for the first switch, and the second input comprises a control terminal for the second switch.

Example 19

The circuit of any combination of examples 15 through 18, wherein the first switch comprises a P-type metal oxide semiconductor field effect transistor (MOSFET), wherein the second switch comprises a N-type MOSFET, wherein the first output of the dual channel circuit comprises a drain of the first switch, and wherein the second output of the dual channel circuit comprises a drain of the second switch.

Example 20

The circuit of any combination of examples 15 through 19, wherein when the drive signal is OFF the mode switch is OPEN, and wherein when the drive signal is ON, the mode switch is CLOSED.

Various examples of the disclosure have been described. These and other examples are within the scope of the following claims.

What is claimed is:

1. A heating, ventilation, and air conditioning (HVAC) controller comprising:
   an alternating current (AC) load switch circuit comprising a first power input terminal, a second power input terminal, a power output terminal, and a power stealing circuit, the AC load switch circuit configured to:
   receive AC power at the first power input terminal;
   determine whether an HVAC load is connected to the power output terminal;
   siphon electrical power, with the power stealing circuit, from the HVAC load when the HVAC load is connected to the power output terminal;

a power converter circuit configured to receive a drive signal and in response to receiving the drive signal, output electrical power to the second power input terminal;

processing circuitry operatively coupled to a memory; the processing circuitry configured to:
receive an indication of whether the HVAC load is connected to the power output terminal;
receive an indication of whether a voltage magnitude at the second power input terminal is above a threshold voltage;
in response to determining that:
the HVAC load is connected to the power output terminal, and
the voltage magnitude at the second power input terminal is less than a voltage magnitude; output the drive signal to the power converter circuit.

2. The controller of claim 1, wherein the AC load switch circuit is further configured to control operation of the HVAC load based on commands from the processing circuitry.

3. The controller of claim 2, wherein the HVAC controller further comprises one or more sensors, and wherein the processing circuitry is configured to send commands to the AC load switch circuit based on comparing indications received from the one or more sensors to a setpoint stored at the memory.

4. The controller of claim 1, wherein the processing circuitry is configured to receive the indication of whether the voltage magnitude at the second power input terminal is above the threshold voltage based on a digital message from the AC load switch circuit.

5. The controller of claim 1, further comprising a voltage sampling circuit configured to determine the voltage at the second power input terminal, and wherein the processing circuitry is configured to receive the indication of whether the voltage magnitude at the second power input terminal is above the threshold voltage from the voltage sampling circuit.

6. The controller of claim 1, wherein the processing circuitry is further configured to, in response to determining that the voltage magnitude at the second power input terminal is less than a voltage magnitude; output a mode signal, wherein the mode signal disables the power stealing circuit.

7. The controller of claim 1, wherein the processing circuitry is further configured to in response to determining that the voltage magnitude at the second power input terminal is greater than the voltage magnitude, withhold the drive signal.

8. The controller of claim 1, wherein the power stealing circuit is further configured to charge an electrical power storage device connected to the second power input terminal, and the electrical power storage device is a capacitor.

9. A method comprising:
receiving alternating current (AC) electrical power at a first power input terminal; receiving an electrical connection at a power output terminal;
when a load is connected to the power output terminal, charging an electrical power storage device using power from the load, wherein a power stealing circuit obtains the electrical power to charge the electrical power storage device;
in response to the load being connected to the power output terminal, determining a voltage level of the electrical power storage device; and
in response to the power stealing circuit not charging the electrical power storage device above a threshold, receiving direct current (DC) power at a second power input terminal, and disabling the power stealing circuit.

10. The method of claim 9, further comprising, in response to determining that the power stealing circuit does not charge the electrical power storage device above the threshold, outputting a digital message indicating that the power stealing circuit does not charge the electrical power storage device above the threshold.

11. The method of claim 9, further comprising, in response to determining that the power stealing circuit does not charge the electrical power storage device above the threshold, receiving a mode signal, wherein the mode signal disables the power stealing circuit.

12. The method of claim 9, further comprising, in response to determining that the power stealing circuit charges the electrical power storage device above the voltage threshold, controlling operation of the load using electrical power provided by the power stealing circuit.

13. The method of claim 9, wherein the load is a heating, ventilation, and air conditioning (HVAC) load.

14. The method of claim 9, wherein the electrical power storage device is a capacitor.

15. A circuit comprising:
an input interface;
a signal conditioner and driver connected to the input interface;
an isolation transformer connected to the signal conditioner and driver,
an alternating current (AC) load switch circuit comprising: a reference terminal, a mode terminal, a Vcc terminal, and a power stealing circuit; and
a mode switch comprising a control terminal configured to control a connection between the mode terminal and the reference terminal;
wherein:
the input interface comprises a transistor having an input for receiving a drive signal,
the signal conditioner and driver comprise a dual channel circuit,
the dual channel circuit has a first input connected to an output of the transistor, and a second input connected to the input of the transistor,
the isolation transformer has a first end of a primary winding connected to a first output of the dual channel circuit and a second end of the primary winding connected to a second output of the dual channel circuit,
the transformer has a first end of a secondary winding connected to the reference terminal of the AC load switch circuit and a second end of the secondary winding connected to the control terminal of the mode switch, and
closing the mode switch disables the power stealing circuit of the AC load switch circuit.

16. The circuit of claim 15, wherein the drive signal comprises a pulse width modulated signal.

17. The circuit of claim 16, wherein the drive signal is defined by a duty cycle of less than ten percent.

18. The circuit of claim 15, wherein the signal conditioner and driver comprise a first switch and a second switch, wherein: the first input comprises a control terminal for the first switch, and the second input comprises a control terminal for the second switch.

19. The circuit of claim 18,
wherein the first switch comprises a P-type metal oxide semiconductor field effect transistor (MOSFET),
wherein the second switch comprises a N-type MOSFET, wherein the first output of the dual channel circuit comprises a drain of the first switch, and wherein the second output of the dual channel circuit comprises a drain of the second switch.

20. The circuit of claim 15, wherein when the drive signal is OFF the mode switch is OPEN, and wherein when the drive signal is ON, the mode switch is CLOSED.

\* \* \* \* \*